United States Patent
Sundell et al.

(10) Patent No.: US 10,705,200 B2
(45) Date of Patent: Jul. 7, 2020

(54) METHOD AND SYSTEM FOR OPERATING AN IFF/SSR ANTENNA

(71) Applicant: SAAB AB, Linkoeping (SE)

(72) Inventors: Lars Sundell, Moelndal (SE); Per Wall, Goeteborg (SE); Bengt Svensson, Moelndal (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/092,405

(22) PCT Filed: Apr. 20, 2016

(86) PCT No.: PCT/SE2016/050345
§ 371 (c)(1),
(2) Date: Oct. 9, 2018

(87) PCT Pub. No.: WO2017/184042
PCT Pub. Date: Oct. 26, 2017

(65) Prior Publication Data
US 2019/0353772 A1 Nov. 21, 2019

(51) Int. Cl.
*G01S 13/78* (2006.01)
*G01S 7/03* (2006.01)
*H01Q 3/34* (2006.01)

(52) U.S. Cl.
CPC ............ *G01S 13/782* (2013.01); *G01S 7/032* (2013.01); *H01Q 3/34* (2013.01)

(58) Field of Classification Search
CPC ...... G01S 13/78; G01S 13/781; G01S 13/782; G01S 7/03; G01S 7/032; G01S 7/282;
(Continued)

(56) References Cited

U.S. PATENT DOCUMENTS 2,517,540 A 8/1950 Busignies
3,427,621 A 2/1969 Brunner
(Continued)

FOREIGN PATENT DOCUMENTS

CN 103558594 B 11/2015
EP 0053512 A1 6/1982
(Continued)

OTHER PUBLICATIONS

International Searching Authority, International Search Report and Written Opinion for Application No. PCT/SE2016/050345, dated Jan. 30, 2017, 12 pages, Swedish Patent and Registration Office, Sweden.

(Continued)

*Primary Examiner* — Peter M Bythrow
(74) *Attorney, Agent, or Firm* — Alston & Bird LLP (57) ABSTRACT

An antenna system for providing identification functionality comprising a main antenna and an auxiliary antenna, wherein the antennas are configured to at least transmit electromagnetic waves. The antenna system comprises a first channel interface and a second channel interface, a first switch and a transmission input means. The first switch is configured to switch between a first operation mode and a second operation mode. When set in the first operation mode the second channel interface is set to be in connection with the auxiliary antenna and when set in the second operation mode the second channel interface is set to be in connection with the main antenna. If transmission via the first transmission channel is expected the transmission input means is configured to set the first switch in the first operation mode. Thereby the main antenna can be used for transmission of signals both provided via the first and second channel interfaces and when transmission via the first and second channel interfaces simultaneously is required the signal (Continued)

provided via the first channel interface will be transmitted by the main antenna and the signal provided via the second channel interface will be transmitted by the auxiliary antenna.

11 Claims, 4 Drawing Sheets

(58) Field of Classification Search
CPC ........ H01Q 21/28; H01Q 21/29; H01Q 25/00; H01Q 25/02
See application file for complete search history.

(56) References Cited

U.S. PATENT DOCUMENTS

| | | | | |
|---|---|---|---|---|
| 3,833,904 | A | * | 9/1974 | Gebhardt .............. G01S 13/106 342/83 |
| 4,918,458 | A | * | 4/1990 | Brunner ................. G01S 13/74 342/42 |
| 5,231,413 | A | * | 7/1993 | Dubois .................. G01S 13/78 343/833 |
| 5,302,953 | A | * | 4/1994 | Pierre .................... H01Q 25/02 342/158 |
| 5,410,316 | A | * | 4/1995 | Brooks ................ G01S 7/2813 342/175 |
| 5,596,326 | A | * | 1/1997 | Fitts ..................... G01S 13/878 342/30 |
| 6,222,480 | B1 | * | 4/2001 | Kuntman ............. G01S 13/767 342/30 |
| 6,313,783 | B1 | * | 11/2001 | Kuntman ............... G01S 13/76 342/29 |
| 6,674,390 | B1 | * | 1/2004 | Murphy, Jr. ............ G01S 13/72 342/13 |
| 7,671,785 | B1 | * | 3/2010 | Walker ................... G01S 7/024 342/26 D |
| 2004/0027305 | A1 | * | 2/2004 | Pleva ..................... G01S 7/032 343/853 |
| 2004/0077316 | A1 | | 4/2004 | Xiong |
| 2004/0246168 | A1 | * | 12/2004 | Isaji ......................... G01S 7/03 342/70 |
| 2008/0258964 | A1 | * | 10/2008 | Schoeberl .............. G01S 7/032 342/189 |
| 2008/0291077 | A1 | * | 11/2008 | Chang ................... G01S 13/89 342/59 |
| 2011/0074620 | A1 | * | 3/2011 | Wintermantel ........ G01S 7/032 342/70 |
| 2012/0068878 | A1 | | 3/2012 | Billaud et al. |
| 2014/0148215 | A1 | | 5/2014 | Liu et al. |
| 2014/0340253 | A1 | * | 11/2014 | Koerber ................. G01S 7/032 342/104 |

FOREIGN PATENT DOCUMENTS

| | | |
|---|---|---|
| EP | 2259085 A1 | 12/2010 |
| EP | 2922144 A1 | 9/2015 |
| GB | 2219471 A | 12/1989 |
| WO | WO 2001/11389 A1 | 2/2001 |

OTHER PUBLICATIONS

Extended European Search Report for European Patent Application No. 16899593.4, dated Nov. 21, 2019, (12 pages), European Patent Office, Munich, Germany.

* cited by examiner

METHOD AND SYSTEM FOR OPERATING AN IFF/SSR ANTENNA

CROSS REFERENCE TO RELATED APPLICATIONS

This application is a National Stage Application, filed under 35 U.S.C. 371, of International Application No. PCT/SE2016/050345, filed Apr. 20, 2016; the contents of which as are hereby incorporated by reference in their entirety.

BACKGROUND

Related Field

The present invention relates to an improved antenna system providing IFF/SSR functionality, particularly to an improved antenna system providing IFF/SSR functionality capable of operating in mode S.

Description of Related Art

In order for e.g. military airborne units such as aircrafts to be able to identify themselves and provide other requested information systems commonly referred to as IFF systems, Identify Friend or Foe, are used. Corresponding civilian applications are generally referred to as SSR systems, Secondary Surveillance Radar. Herein such systems are simply generally referred to as identification systems.

Increased use of electronically scanned array radars, generally referred to as PESA (Passive Electronically Scanned Array) or AESA (Active Electronically Scanned Array), and herein referred to as electronically steerable radar systems, implies new challenges e.g. in terms of how to provide IFF/SSR functionality, generally without the presence of a mechanically rotated antenna.

Electronically steerable radar systems comprise numerous transmit and/or receive elements, wherein each element is configured to transmit and/or receive separate electromagnetic waves of the radio frequency spectrum, also referred to as RF signals. RF signals are herein also referred to as just signals. The RF signals, thus the electromagnetic waveforms, can generally be controlled in phase, amplitude, frequency and/or time. For PESA systems the antenna elements are fed with a centrally amplified signal wherein for AESA systems each antenna element is provided with an individual power amplifier generally arranged together with a phase shifter. This will be explained more in detail later on.

The power of the radiated electromagnetic waves, thus the energy radiated, in elevation and azimuth direction generates what is referred to as, and generally visualized as, an antenna pattern. The electromagnetic waves transmitted by the individual antenna elements of an antenna array interfere constructively at certain angles in front of the antenna and form the antenna radiation pattern. The main lobe points in the direction where the antenna radiates maximum energy and defines the main radiation direction of the antenna. The antenna pattern, also referred to as radiation pattern or far-field pattern, thus refers to and visualizes the angular directional dependency of the strength of the electromagnetic waves transmitted by the antenna. Besides the main lobe, directed transmission of an antenna inevitably produces local maxima of a far field radiation pattern referred to as side lobes and, for lobes pointing essentially 180 degrees from the direction of the main lobe, back lobes.

For an electronically steerable antenna the direction in which the antenna points or is directed, thus the direction in which the antenna radiates maximum energy, can be controlled by controlling the phase of the transmitted electromagnetic waves of the individual antenna elements. This is generally accomplished by means of phase shifters controlling the phase of respective antenna element. The power density of the side lobes is generally much less than of the main lobe. Excessive side lobe radiation wastes energy and may cause interference. Thus, it is desirable that as much as possible of the available energy is forming the main lobe and that the energy radiated as side lobes is kept to a minimum. The level of the side lobes are generally measured in dB in relation to the main lobe, or as a ratio in relation to the main lobe.

The antenna elements transmitting and receiving signals or electromagnetic waves may be the same antenna elements, wherein a decoupler, switch, circulator or similar is used to control if the antenna is in transmission or receiving mode, or be separate antenna elements used only for either transmission or reception.

During transmission all the antenna elements may be fed in phase in the current pointing direction, which is referred to as transmission in sum channel, or be fed with different phases. E.g. one half of the antenna may transmit electromagnetic waves which are essentially 180 degree out of phase of the electromagnetic waves transmitted by the other half of the antenna. This is referred to as transmission in delta, or difference, channel.

Please note that also the pointing direction of an electronically steerable antenna, if not being controlled by time delay, may be determined by the phase.

Antenna systems used as IFF/SSR antenna systems are generally also configured for transmitting control signals via a control channel, giving rise to control signal antenna patterns. Conventionally such control signals have been transmitted by a separate omnidirectional antenna, wherein the control signal antenna pattern may be omnidirectional. Control signals may also be transmitted by applying the same antenna as is used to transmit via the sum and delta channel, and then the control signal is generally transmitted via the delta channel.

The basic principle behind the communication protocol system used for providing the identification functionality is based on a system developed during the Second World War, which continuously has been further developed ever since. The functionality of the identification systems used are regulated in e.g. the civilian ICAO standard and the military NATO standard STANAG 4193.

The functionality of identification systems is that a signal processing device of an interrogating unit generates a signal which subsequently is transmitted by means of an antenna. This is generally referred to as transmission of an interrogation signal. The interrogating unit may e.g. be an aircraft, a ground based vehicle or similar. The interrogation signal comprises information regarding what type of information that is requested from a receiving unit. A transponder unit at a receiving unit, wherein the receiving unit also may be e.g. an aircraft or similar, may e.g. be requested to identify itself or to inform the interrogating unit of current barometric altitude or speed. This will be disclosed more in detail later on. The transponder unit of the receiving unit receives the transmitted interrogation signal and replies with a coded reply signal comprising the requested information. The reply signal is received by the interrogating unit and is subsequently decoded and processed by the signal processing device, or other calculating means configured to process the received information.

During operation of an identification system it is preferred that only transponders of aircrafts or similar which are present within the current pointing direction of the antenna, thus transponders which are present within the current pointing direction of the main lobe of the antenna pattern of the interrogation signal, are triggered or at least that such transponders can be separated from transponders triggered by a side lobe of the interrogation signal. However, if the side lobes of the interrogation signal antenna pattern are sufficiently strong it is also possible that transponders of aircrafts or similar which are present within such side lobes unintentionally are triggered. In order to avoid that transponders outside of the main lobe of the interrogation signal antenna pattern are triggered, or at least to be able to separate triggering by side lobes, a control signal in form of an ISLS, Interrogator Side Lobe Suppression, signal, having a control signal antenna pattern, shall, according at least to some prevailing standards, also be transmitted. ISLS control signals are employed to suppress transponder replies from the side lobes of the interrogation signal antenna pattern or to at least be able to identify such replies.

Generally, the transponders of the units requested e.g. to identify themselves are configured for receiving the transmitted ISLS control signal and, preferably by means of amplitude comparison in regards to previously and/or subsequently received pulses, determine whether the received interrogation signal is derived from the main lobe of the interrogation pulse or from a side lobe. The determination of whether the received interrogation signal is derived from a valid main lobe may be performed by looking at the difference in signal strength, measured in dB relative the maximum level of the main lobe, between the interrogation signal and the ISLS control pulse. E.g., according to the STANAG 4193 and ICAO standards, it is regulated that the ISLS control signal antenna pattern is configured to be, at all angles of elevation, 9 dB, or more, below the interrogation signal antenna pattern in the direction of the main lobe of the antenna and equal to, or greater than, the interrogation signal antenna pattern within the desired directions of suppression of the side lobes of the interrogation signal antenna pattern. Thus, it is preferable that the antenna pattern of the ISLS control signal has as distinct minima or nullification point in the direction of the main lobe of the interrogation signal. The desired directions of side lobe suppression are the directions wherein the level of the interrogation signal side lobes is not at least 40 dB below the peak of the interrogation signal main lobe.

There are several modes that can be used for identification or interrogation, herein referred to interrogation modes. Different modes may be characterized in different ways and by different characteristics, and e.g. modes A and C may be characterized by the difference in time between two sequentially transmitted pulses. Thus, when herein referring to interrogation signal what is referred to is actually the sequence of pulses together forming a request for information in accordance to current operation mode. Generally, as previously mentioned, when herein referring to signal what is referred to is an electromagnetic wave, also referred to as a RF signal (Radio Frequency), configured to carry information and being transmitted from or received by an antenna system.

Traditionally, mode A, used for identification of the identity code of the aircraft, and mode C, used for indicating the altitude of the aircraft, have been the two far most commonly used operation modes. However, for most parts of the world, during the last decades mode S, or mode Select, has emerged as a commonly used operation mode and today essentially all aircrafts have to be provided with a transponder capable of responding to a mode S interrogation signal, and essentially all transponders have to be compatible with mode S in order to fulfil prevailing standards. Mode S includes a more robust communication protocol and enables a wider range of information exchange. The major advantage of mode S is the ability to interrogate a single aircraft at a time.

Unlike e.g. mode A and mode C, when operating in mode S transmission in the sum channel and in the delta channel, which for this particular purpose is used as to transmit a control signal, has to be performed simultaneously. If not a separate antenna is used for transmission in the control channel, transmission via the sum channel and transmission via the delta channel generally is performed by means of the same antenna. The antenna including phase shifters, amplifiers etc. are preferably configured to operate at maximum efficiency when transmitting via either the sum channel or via the delta channel, not for when transmitting via the sum and delta channels simultaneously. Thus, simultaneous transmission at operation in mode S may be problematic.

As is apparent for a person skilled in the art, when herein referring to maximum power level and maximum power efficiency what is referred to is, given all trade offs and deliberate limitations of power levels and efficiency levels due to e.g. cost, an elevated power level and efficiency level in relation other levels referred to. Thus, the word maximum is not to be interpreted as ideal maximum but as an elevated level in relation to other levels referred to.

This is a very simplified description of the operations of antenna systems and the basic principles of identification functionality, but still sufficiently detailed to establish that there is room for further improvements.

BRIEF SUMMARY

With the above description in mind, then, an aspect of the present invention is to provide an improved antenna system which seeks to mitigate, alleviate, or eliminate one or more of the above identified deficiencies and problems of prior art solutions. The present invention is defined by appended independent claim 1. Various exemplary aspects of the present invention are set forth by the appended dependent claims as well as by the following description and the accompanying drawings. The present invention further relates to an antenna comprising such improved antenna system. Such antenna is also defined by an appended independent claim.

According to a first exemplary aspect of the present invention an antenna system, which is configured for providing identification functionality, and wherein the antenna system is configured to be connected to a signal processing device, comprises a main antenna, configured to at least transmit electromagnetic waves, and an auxiliary antenna, configured to at least transmit electromagnetic waves, a first channel interface, configured to at least receive an electromagnetic waveform provided from the signal processing device when the antenna system is transmitting via a first transmission channel, and a second channel interface, configured to at least receive an electromagnetic waveform provided from the signal processing device when the antenna system is transmitting via a second transmission channel.

The first channel interface is arranged to be connected to the main antenna and the second channel interface is arranged to be connectable to the main antenna and to the auxiliary antenna.

The antenna system according to the first exemplary aspect is further characterized in that the antenna system comprises a first switch and a transmission input means. The first switch is configured to be capable to switch between a first operation mode and a second operation mode. When set in the first operation mode the second channel interface is set to be in connection with the auxiliary antenna and when set in the second operation mode the second channel interface is set to be in connection with the main antenna. The transmission input means, of which exemplary embodiments are disclosed below, is configured to provide information directly or indirectly to the first switch at least concerning if transmission via the first transmission channel is expected, wherein if transmission via the first transmission channel is expected the transmission input means is configured to provide such that the first switch is set in the first operation mode.

By indirectly is herein considered that even if the transmission input means does not provide information to the first switch directly the transmission input means is required in order to enable the first switch to be informed of that the first switch should be set in the first operation mode. Thus, when herein stating the transmission input means controls the switch what actually is meant is that the transmission input means contributed to controlling, preferably by means of additional components, the operations, thus the setting, of the first switch.

By expected is herein considered, as will be explained more in detail later, that transmission via the first transmission channel is expected since it is known due to that e.g. a suppression pulse output signal is provided or that transmission via the first transmission channel is expected since it already has been detected. Thus, expected is here defined as expected due to that information indicating so is available, or expected since already having been detected. By detected is herein considered that e.g. a recognizable power level is detected. According to prevailing standards there will be sufficient time for the first switch to be set in the first operation mode when a recognizable power level has been detected by the detector. Note that the second channel interface may be set in connection to the auxiliary antenna even if no transmission currently is expected via the second transmission channel.

The first channel interface may, according to aspects of the present invention, e.g. be an interface for transmission in, what generally is referred to, a sum channel of a sum channel signal and the second channel interface may be an interface for transmission in, what generally is referred to, a delta or difference channel of a delta or difference channel signal, wherein the delta channel signal may, for this particular application, be a control signal.

An exemplary advantage with the exemplary aspect of the present invention is that the present invention enables the main antenna to be operated at maximum efficiency, given the specific circumstances and including other deliberate trade offs and limitations necessary, for transmission of both signals provided via the first channel interface and via the second channel interfaces, at the same time as transmission via the both the first and the second channel interfaces simultaneously, if that is required, is enabled. The main antenna, which possibly has higher directivity and provides narrower antenna lobe in the pointing direction of the antenna than the auxiliary antenna, and therefore preferably is used as much as possible, may be utilized for transmission irrespectively of if a signal to be transmitted is provided via the first or second channel interface, unless transmission via both the first and the second channel interfaces is performed simultaneously. Simultaneous transmission may e.g. occur at operation in mode S. At simultaneous transmission via both the first and the second channel interfaces the first channel interface is set in connection to the main antenna and the second channel interface is set in connection to the auxiliary antenna, wherein transmission of a RF signal provided via the first channel interface can be performed via the main antenna and transmission of a RF signal provided via the second channel interface can be performed via the auxiliary antenna simultaneously.

Without this functionality, and if no separate antenna is used for the control signal, the main antenna would have to be configured for operating at an efficiency level significantly below maximum efficiency since the antenna would have to be able to operate at essentially double the regular transmission power when operating in mode S, i.e. when transmitting the sum and control signal simultaneously.

The present invention relates to various developments of an improved antenna system. The antenna system is connectable to a signal processing device. The signal processing device may be any device configured at least to generate electromagnetic waveforms. According to aspects of the present invention it is also preferable that the signal processing device is configured to receive signals and subsequently also to process, i.e. decode, decrypt, interpret etc., received signals. Thus, the signal generating device may be, but is not limited to be, able to process received signals. Such functionality may also be provided by a separate processing device. An example of such a signal processing device is what generally is referred to as an interrogator. The functionality of what herein is referred to as signal processing device is considered to be common general knowledge and is not part of the invention per se, hence is not disclosed more in detail herein.

Since the present invention refers primarily to IFF/SSR functionality where control signals are most interesting, the second channel interface may primarily be seen as an interface for control signals. Consequently, according to aspects of the present invention the first transmission channel may be a sum transmission channel and the second transmission channel may be a delta transmission channel or control transmission channel.

When referring to "arranged in connection with" what is referred to is that, according to the exemplary example, the second channel interface may be directly connected to the main antenna or indirectly connected to, i.e. via any number of additional components, the main antenna. It is also possible that the respective connection referred to is established by means of wireless communication such as Wi-Fi or similar. What is important is that signal from the second channel interface reaches the main or auxiliary antenna.

According to a first exemplary embodiment of the transmission input means, the transmission input means comprises an information interface. The information interface is configured to receive input information from the signal processing means concerning future transmissions. To have access to information regarding future transmissions, i.e. be informed of if future signals to be transmitted is e.g. a sum channel signal, a delta channel signal or a control signal, hence if future transmission will be executed via the first or the second channel interface, is valuable information in order to be able to operate the antenna system as efficiently as possible. This is particularly important if future transmission in mode S is expected. When set in the first operation mode the second channel interface is set to be connected to the auxiliary antenna, wherein if when operating in the first operation mode both transmission via the first channel interface and the second channel interface is executed the signal provided via the first channel interface, preferably a sum channel signal, will be sent by the main antenna and the signal provided via the second channel interface, preferably a control signal, will be sent by the auxiliary antenna.

According to a second exemplary embodiment of the transmission input means, the transmission input means comprises a detector. The detector is configured for detecting transmission in the first transmission channel. The detector is further configured to, if detection in the first transmission channel is detected, set the first switch in the first operation mode. Thus, here detection of transmission via the first transmission channel is defined as that transmission in the first transmission channel is expected. If no transmission via the first transmission channel is performed, hence no transmission via first transmission channel is detected by the detector, the switch is set in the second operation mode wherein the second channel interface is set to be in connection to the main antenna. If transmission in the first transmission channel is detected by the detector the first switch is set in the first operation mode wherein the second transmission channel is set in connection to the auxiliary antenna.

As is obvious for a person skilled in the art, the actual detection of that transmission via the first transmission channel is expected may be performed by that e.g. a pre signal, which is characteristic for that transmission of e.g. a sum channel signal is to be expected, is detected, or by that another signal or transmission pattern indicating that transmission via the first transmission channel is to be expected, is detected. What signal, or what part of a signal, that is used as specific identification of that transmission is to be expected, may be selected based on a number of criteria such as prevailing standard, implementation of the antenna system and current operation mode.

An antenna system comprising a transmission input means in turn comprising a detector has the exemplary advantage that it can operate efficiently without the need of additional input from the signal processing device. No information is required regarding future transmission sequences, meaning that no information is required regarding if the next signal to be transmitted will be provided via the first channel interface, the second channel interface or perhaps via both the first and second channel interfaces simultaneously. Not having to rely on additional input from the signal processing device has the advantage that the signal processing device can be selected freely, and without that the supplier of the signal processing device has to be involved. To not be dependent on what type of signal processing device that is used, or from which supplier the signal processing device is purchased, is highly desirable from a cost and procurement perspective. This enables e.g. that an interrogator originally designed for a conventional mechanically rotated, probably less expensive, antenna can be used.

According to yet further aspects of the present invention the transmission input means comprises both an information interface and a detector in correspondence to what has been previously disclosed. As is obvious for a person skilled in the art, there are also other methods than the ones explicitly mentioned herein, made available by an antenna system according to the present invention, that may be used in order to determine that transmission in the first transmission channel is expected and that thereby the the second channel interface should be set in connection to the auxiliary antenna.

In theory there are no limitations when it comes to number of antenna elements, but in practice the number of antenna elements of respective antenna is dependent on e.g. cost, available space and desired antenna characteristics. In addition to phase, amplitude, timing etc. of the transmitted signal the number of antenna elements of respective antenna is one of the parameters that affects, thus can be used to configure, the characteristics of a signal transmitted by an antenna. Other parameters are e.g. type of antenna elements used, amplification capability of used amplifiers and the separation in width of the antenna, which will affect the power density. Naturally, it is also possible to only use a subset of the available antenna elements when transmitting. The characteristics of a transmitted signal affects the resulting antenna pattern of respective signal such that e.g. an antenna pattern fulfilling prevailing standards for respective signal can be obtained.

As previously stated, an electromagnetic waveform, referred to as RF signal, generated by a signal processing device, to be transmitted is provided via the first or second channel interface depending on the type of signal that is about to be transmitted. During certain operation modes, such as mode S, transmission via both the first and the second channel interfaces is performed simultaneously. According to yet further aspects of the present invention the first channel interface is arranged to be in connection to the main antenna by means of a first main antenna distribution network, the second channel interface is arranged to be connectable to the main antenna by means of a second main antenna distribution network, and the second channel interface is also arranged to be connectable to the auxiliary antenna by means of an auxiliary antenna distribution network. Thus, the first channel interface is always connected to the main antenna by the first main antenna distribution network whereas the second channel interface may be connected either to the main antenna by the second main antenna distribution network or the auxiliary antenna by the auxiliary antenna distribution network. If the second main antenna distribution network connects the second channel interface to the main antenna or if the auxiliary antenna distribution network connects the second channel interface to the auxiliary antenna is dependent on current operation mode of the antenna system in accordance to:

- if no transmission in the first transmission channel is expected or detected the transmission input means contributes to controlling such that the first switch to be set in the second operation mode. When the first switch is set in the second operation mode the second channel interface is set to be connected to the main antenna by means of the second main antenna distribution network, and
- if transmission in the first transmission channel is expected or detected the transmission input means contributed to controlling such that the first switch to be set in the first operation mode. When the first switch is set in the first operation mode the second channel interface is set to be connected to the auxiliary antenna by means of the auxiliary antenna distribution network.

This has the exemplary effect that, by controlling the operations or setting of the first switch, transmission via the first transmission channel is always possibly since the first channel interface is always connected to the main antenna via the first main antenna distribution network. Transmission via the second transmission channel is also always possible since; if no transmission currently is performed in the first transmission channel the second main antenna distribution network connects the second channel interface to the main antenna, and; if transmission via the first transmission channel currently is performed or is expected the second channel interface is connected to the auxiliary antenna by the auxiliary antenna distribution network.

The distribution network arranged between the second channel interface and the first switch is referred to as a pre distribution network.

The phase of an electromagnetic waveform fed via a conductive line is dependent on the configuration of the conductive line. Conductive line is defined as any conductive connection capable of conducting an electromagnetic waveform such as e.g. a wire conductor, a stripline conductor or similar. Various properties such as e.g. the length of conductive lines in form of wire conductors, the material used in the conductive line or for insulation of the conductive line, as well as addition of a phase affecting component to the conductive line, affects the phase of an electromagnetic waveform fed via such a wire conductor. Thus, the phase of the an electromagnetic wave form can be controlled by selecting or configuring different signal phase paths, and according to aspects of the present invention this can be used in order to determine the transmission phase of a signal transmitted by means of the distribution network.

According to such aspects of the present invention the phase of an electromagnetic waveform fed via the first main antenna distribution network is dependent on the configuration of the first main antenna distribution network, the phase of an electromagnetic waveform fed via the second main antenna distribution network is dependent on the configuration of the second main antenna distribution network and the phase of an electromagnetic waveform fed via the auxiliary antenna distribution network is dependent on the configuration of the auxiliary antenna distribution network. Thereby the phase of an electromagnetic waveform fed via at least one of the first main antenna distribution network, the second main antenna distribution network and the auxiliary antenna distribution network is controllable by means of the configuration of respective distribution network.

Generally described, the control signal should be configured such that the antenna pattern of the control signal is larger than the antenna pattern of the interrogation signal in all transmission directions, such as in the directions of side lobes and back lobes, except for the direction of the main lobe, hence the current pointing direction of the antenna. This should be true for all modes of transmission, including mode S.

Using the configuration of conductive lines to affect the phase, thus the configuration, of an electromagnetic waveform fed via a distribution network is an efficient, and cost effective, way of controlling the resulting phase of an electromagnetic waveform. Controlling the phase of an electromagnetic waveform can be used in order to obtain desirable signal characteristics of the transmitted electromagnetic waveform. As previously disclosed, when a signal is transmitted via the auxiliary antenna, such as at transmission in mode S, the signal transmitted may be a control signal, more particularly, in accordance with what previously has been disclosed, the signal transmitted may be an ISLS control signal. With a properly configured auxiliary antenna distribution network, i.e. properly configured conductive lines of the auxiliary antenna distribution network, an ISLS control signal fulfilling prevailing standards may be obtained without having to further adapt or affect the characteristics of the signal.

Thus according to aspects of the present invention, with properly configured conductive lines of the auxiliary antenna distribution network a phase offset forming an ISLS control pulse can be created having characteristics and antenna pattern satisfying prevailing standards. Correspondingly, with properly configured conductive lines of the second main antenna distribution network a phase offset forming an ISLS control pulse can be created having characteristics and antenna pattern satisfying prevailing standards, when the main antenna is used. This is a particularly advantageous exemplary aspect for embodiments of the present invention where the transmission input means does not receive input information from the signal processing means concerning future transmissions, thus the antenna system is not configured to receive input information from the interrogator or similar, such as for embodiments where the transmission input means comprises a detector configured to detect transmission via the first channel interface.

According to yet other aspects of the present invention the first main antenna distribution network is set to be connected to a first number of antenna elements and the second main antenna distribution network is set to be connected to a second number of antenna elements of the main antenna, wherein the first number of antenna elements preferably is higher than the second number of antenna elements. From a cost and optimization of available space perspective it may be preferred to have a main antenna with more antenna elements, and an auxiliary antenna with less antenna elements, since the main antenna is the antenna used for transmission the predominant part of the time. However, the number of antenna elements of respective antenna is also dependent on desired antenna characteristics.

According to further advantageous aspects of the present invention the antenna elements of the main antenna and of the auxiliary antenna are identical antenna elements. Using the same type of antenna elements for both the main and auxiliary antenna may e.g. be advantageous from a cost perspective, may simplify the configuration of respective antenna and is also beneficial since fewer components and spare parts are needed. According to another advantageous aspect of the present invention the main antenna comprises more antenna elements, i.e. a higher number of antenna elements, than the more seldom used auxiliary antenna. This approach may be used to save cost, but also has the effect that the auxiliary antenna requires less space.

The aspects of antenna systems, singly or in combination, of the present invention are first and foremost advantageous for active electronically steerable antenna system. Even though many of the exemplary aspects of antenna system disclosed herein advantageously can be implemented in conventional mechanically rotated antennas and Passive Electronically Scanned Arrays, i.e. PESAs, the present invention is primarily developed for active electronically steerable antenna systems, i.e. Active Electronically Steerable Arrays, AESAs. As is apparent for a person skilled in the art this is due to the problems associated with distributed amplification of respective antenna element for active electronically steerable antennas.

So far only transmission by means of the main antenna has been discussed. However, the main antenna may also be used for receiving electromagnetic waveforms.

According to further aspects of the present invention the electronically steerable antenna system further comprises a second switch, wherein the second switch is configured to switch between a transmission mode and a reception mode. When set in the transmission mode the second channel interface is set to be in connection with an end portion of the second main antenna distribution network of the second main antenna distribution network. When set in the reception mode, the second channel interface is set to be in connection with the first main antenna distribution network of the main antenna. Thus, at reception mode all antenna elements of the main antenna are, as always, connected to the first channel interface by the first main antenna distribution network, but all the antenna elements of the main antenna is also connected to the second channel interface by the second main antenna distribution network.

As will be disclosed more in detail later on the first and second distribution network converge at a power splitting device. At reception the power splitting device is used to split up a received signal into what preferably may be a sum channel signal part and a delta channel signal part. The sum channel signal part is provided via the first main antenna distribution network to the signal processing device and the delta channel signal part is provided via the second channel interface to the signal processing means. Thereby the received signal can be processed. Processing of received sum and delta channel signals are considered to be common general knowledge and is not further disclosed herein.

At transmission mode (when transmitting by means of the main antenna) the second channel interface is connected to the main antenna via the pre distribution network, the first switch, the second main antenna distribution network, the second switch and the end portion of the second main antenna distribution network.

At reception mode the second channel interface is connected to the main antenna via the pre distribution network, the first switch, the second main antenna distribution network, the second switch, the delta channel reception network and to the power splitting device of the first main antenna distribution network. The power splitting device is connected to the antenna elements of the main antenna.

At reception it is preferred to use the main antenna which preferably comprises more antenna elements than the auxiliary antenna. The more antenna elements that can be used at reception the better is the accuracy, particularly at the boundary scanning angles of the electronically steerable antenna system.

According to yet further aspects of the present invention the second switch is arranged to be in connection with a signal processing device, and is configured to receive a suppression pulse output signal from the signal processing device. If transmission is expected the second switch is configured to be set in the transmission operation mode. According to prevailing standards such as STANAG 4193 or ICAO Annex 10, volume IV, signal processing devices, thus interrogators, should be provided with a suppression pulse output signal. Thus, even for embodiments of the present invention comprising a second switch configured to receive a suppression pulse output signal processing device can be selected independently of supplier. The suppression output signal is configured to disclose specific signal characteristics and to be high during a predetermined period of time before transmission of an interrogation signal, and subsequently lowered within a predetermined period of time after transmission of the interrogation signal, all according to prevailing standards.

The present invention also refers to methods of operating an antenna system according to any aspect of an antenna system previously disclosed herein, wherein the antenna system comprises:

a main antenna, configured to at least transmit electromagnetic waves,
an auxiliary antenna, configured to at least transmit electromagnetic waves,
a first channel interface, configured to at least receive an electromagnetic waveform provided from the signal processing device when the antenna system is transmitting via a first transmission channel, and
a second channel interface, configured to at least receive an electromagnetic waveform provided from the signal processing device when the antenna system is transmitting via a second transmission channel,
a first switch, configured to be set in a first operation mode and a second operation mode, wherein
when set in the first operation mode the first switch is configured to set the second channel interface in connection to the auxiliary antenna, and
when set in the second operation mode the first switch is configured to set the second channel interface in connection to the main antenna, and
a transmission input means, configured to provide information to the first switch at least concerning if transmission via the first transmission channel is expected,
wherein an aspect of a method comprises the method step of:
applying the transmission input means to determine if transmission via the first transmission channel is expected,
wherein if transmission via the first transmission channel is expected the method further comprises the method step of:
setting the first switch in the first operation mode.

The exemplary aspect of a method of operating an antenna system provides the same advantageous aspects as previously disclosed for respective aspect of antenna system. The method may be executed continuously or during predetermined periods where the advantageous effects provided by the method are required.

The second operation mode, thus when both the first channel interface and second channel interface are set to be in connection to the main antenna, whereby the main antenna is used for transmission if either transmission via the first or second channel interfaces is to be performed, is the default operation mode of the antenna system.

If the first switch is already set in the first operation mode when the method is executed, and when transmission via the first transmission channel is expected, the first switch stays in the first operation mode.

If the first switch is set in the second, default, operation mode when the method is executed, and transmission via the first transmission channel is not expected, the first switch stays in the second operation mode.

If the first switch is set in the first operation mode when the method is executed, and transmission via the first transmission channel is not expected, the first switch is set to the second, default, operation mode.

According to other aspects of methods of operating an antenna system, wherein the transmission input means comprises
a detector, wherein the detector is configured for detecting transmission via the first transmission channel, and wherein the detector is configured to set the first switch in the first operation mode when the detector detects transmission via the first transmission channel, wherein the methods comprise the method step of, when applying the transmission input means:
  detecting transmission in the first transmission channel,
  wherein if transmission in the first transmission channel is detected the methods further comprise the method step of:
  setting the first switch in the first operation mode.

According to yet another aspects of methods of operating an antenna system, wherein the transmission input means comprises
  an information interface, wherein the information interface is configured to receive input information from a signal processing device concerning future transmissions, and wherein if transmission via the first transmission channel is expected the transmission input means is configured to set the first switch in the first operation mode,
wherein the methods comprise the method step of, when applying the transmission input means:
  receiving input information from the signal processing device concerning future transmissions,
  wherein if transmission in the first transmission channel is expected the methods further comprise the method step of:
  setting the first switch in the first operation mode.

Other aspects of the present invention refer to an antenna arrangement comprising an antenna system according to any aspect, or a combination of aspects, which previously has been disclosed herein, and a signal processing device. An exemplary advantage of such an antenna arrangement is, in accordance with what previously has been disclosed together with respective aspect, that the main antenna can be used to transmit both signals provided from the signal processing device via the first channel interface and via the second channel interface, except when signals are provided from the signal processing device via both the first and second channel interfaces simultaneously, such as at operation in mode S, whereby the signal provided via the first channel interface is transmitted by the main antenna and the signal provided via the second channel interface is transmitted by the auxiliary antenna.

According to aspects of the present invention the antenna arrangement additionally comprises an interface controller. The interface controller is configured to control the power level of electromagnetic waveforms fed from/to the signal processing device to/from the first and/or second channel interface, wherein the power levels are controllable by means of attenuation. An exemplary advantage of using an interface controller is that the compatibility between the various components used can be improved in terms of e.g. power level of transmitted and/or received signals, i.e. the electromagnetic waveform transmitted and/or received. By means of the interface controller the power level of an electromagnetic waveform provided to/from the first or second interface channel, wherein the power level may be, but is not limited to be, the same for respective channels, can be controlled. The interface controller is a particularly important feature in order for the antenna system to be able to operate together with a wide selection of signal processing devices which may be configured for operating at various power levels.

According to aspects of the present invention the antenna system further comprises a back filler element. The back filler element is provided to compensate for potential back lobes, and to some extent also to compensate for side lobes, wherein the back filler element transmits a signal covering formed back, and possibly side, lobes.

According to further aspects of the present invention of an antenna arrangement the main antenna and the auxiliary antenna are mounted at a first side of the antenna and the back filler element is mounted at a second side of the antenna, wherein the first and second side of the antenna arrangement are essentially opposite sides of the antenna.

According to other aspects of the present invention the antenna is provided with a rotary joint. The first channel interface and the second channel interface may be arranged at a first side of the rotary joint and the interface control device may be arranged at a second side of the rotary joint. Such aspects of the present invention has the advantage that only the connection between the first channel interface and the interface control device and the connection between the second channel interface and the interface control device need to extend over the rotary joint.

Rotary joints may be used both for conventional mechanically rotated antennas but also for electronically steerable antennas wherein the additional flexibility that the presence of a rotary joint offers may increase the usefulness and improve functionality of the antenna.

The system of the present invention may be applied for both military and civil applications.

The terminology used herein is for the purpose of describing particular exemplary aspects or embodiments only and is not intended to be limiting of the invention. As used herein, the singular forms "a", "an" and "the" are intended to include the plural forms as well, unless the context clearly indicates otherwise. It should further be understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention belongs. It should further be understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and modes of operation of the present invention. However, the invention should be regarded as illustrative rather than restrictive, and not as being limited to the particular examples discussed above. The different features of the various examples of the invention can be combined in other combinations than those explicitly described, unless the context clearly indicates otherwise.

BRIEF DESCRIPTION OF THE FIGURES

With reference to the appended drawings, below follows exemplary embodiments of the present invention.

DETAILED DESCRIPTION OF VARIOUS EMBODIMENTS

The following description of exemplary embodiments is for illustration purposes only and should not be interpreted as limiting for the invention. All examples herein should be seen as part of the general description and are therefore possible to combine, if not something else is explicitly or implicitly stated. Individual features of the various embodiments may be combined or exchanged unless such combination or exchange is clearly contradictory to the overall function of the embodiment or feature. Reoccurring reference signs refer to corresponding elements throughout the detailed description.

Figure 1:
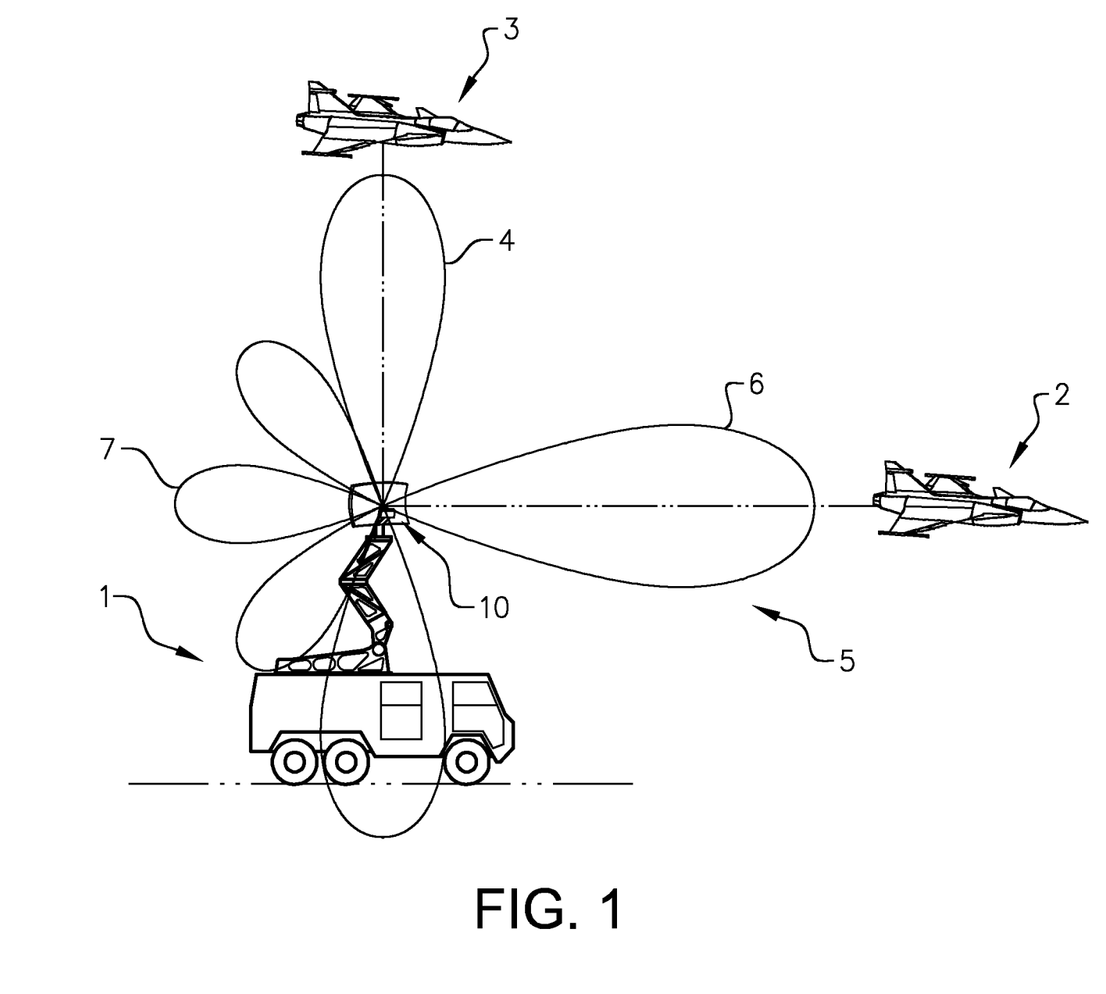
FIG. 1 discloses a schematic aircraft provided with an exemplary embodiment of an antenna system according to an aspect of the present invention, FIG. 2 discloses a schematic invention of a first exemplary embodiment of an antenna system according to the present invention, FIG. 3 discloses a schematic invention of a second exemplary embodiment of an antenna system according to the present invention, and FIG. 4 discloses a schematic invention of a third exemplary embodiment of an antenna system according to the present invention.

FIG. 1 discloses a vehicle 1, provided with an exemplary embodiment of an antenna system 10 according to the present invention. The antenna system 10 may e.g. be configured to transmit an interrogation signal. The angular propagation of the transmitted energy in the far field from an antenna is generally referred to, and schematically shown as, an antenna pattern. An antenna pattern 5 of an interrogation signal transmitted by the vehicle 1 is schematically disclosed in FIG. 1. Further, FIG. 1 discloses a first aircraft 2 and a second aircraft 3, wherein the first aircraft 2 is present in the direction of a main lobe 6 and the second aircraft 3 is present in the direction of a side lobe 4 of the interrogation signal antenna pattern 5. Also disclosed is a back lobe 7.

The interrogation signal preferably comprises information regarding what information that is requested from, in the exemplary embodiment of FIG. 1, the first aircraft 2. The first aircraft 2 may e.g. be requested to identify itself or provide information concerning current barometric altitude. A transponder of the first aircraft 2 receives the interrogation signal, wherein the transponder is triggered to respond with a coded reply signal comprising the requested information. The reply signal is received and decoded by the vehicle 1.

When transmitting an interrogation signal it is first and foremost important that transponders of e.g. aircrafts in the direction of the pointing direction of the antenna, thus in the direction of the main lobe 6, responds. This is hereinafter referred to as true responses. If responses also are provided by aircrafts or similar not in the pointing direction of the main lobe 6 it is important that such responses, hereinafter referred to as false responses, can be separated from the true responses. In order to ensure that the transponder of the first aircraft 2, which currently is in the pointing direction of the antenna system 10, is triggered, and that a true response from the first aircraft 2 can be separated from possibly false responses from the second aircraft 3, transmission of a control signal is applied. The requirements for transmission of control signals, generally referred to ISLS control signals, are regulated by prevailing standards such as e.g. STANAG 4193 or ICAO. Such standards define the characteristics of control signals whereby it is possible for an interrogated unit to, by comparing a received interrogation signal with a subsequently received control signal, detect whether the interrogated unit is present in the direction of a main lobe or in the direction of a side lobe of an interrogation signal antenna pattern.

By referring to the exemplary embodiment of FIG. 1, and assuming the STANAG 4193 or ICAO standards is applied, by measuring the relative signal strengths of the interrogation signal and the subsequently transmitted control signal, and preferably only responding to the interrogation signal if the interrogation signal is at least 9 dB stronger than the control signal, the transponders of the first and second aircrafts 2, 3 may detect whether to respond to the interrogation signal or not. (Generally can be said that a transponder must respond if the interrogation signal is 9 dB higher than the subsequently transmitted control signal, may respond if the interrogation signal is between 0 and 9 dB higher than the subsequently transmitted control signal and is not allowed to respond if the subsequently transmitted control signal is stronger than the preceding signal.)

Avoiding unwanted triggering of transponders of aircrafts or similar outside of the pointing direction, thus within the pointing direction of the side lobes of the interrogation signal antenna pattern, or at least being able to clearly identify which triggering that is due to side lobe triggering, of the antenna system is highly important in order for the IFF/SSR system to be robust and reliable. Hence, it is very important that the transmitted control signals comply with prevailing standards. Conventionally the control signal has been transmitted by a separate antenna, which obviously adds e.g. cost and complexity to such antenna system, or is transmitted by means of efficiency reducing tapering.

Generally, it is advantageous, both when operating an electronically steerable antenna system in transmission mode and when operating in reception mode, to use an antenna with a relatively large number of antenna elements configured to operate at high power levels. A larger number of antenna elements improves directivity of the antenna system at transmission mode and also provides improved reception capabilities at reception mode.

Amplifiers of active electronically steerable antenna systems are generally configured such that they may operate at maximum efficiency, given the specific circumstances and including other deliberate trade offs and limitations necessary, at the power level used for transmission the predominant part of the time. However, as previously explained, an IFF/SSR antenna systems operating in mode S has to be able to transmit both a signal provided via the sum channel and a signal provided via the delta channel, which during operation in mode S may be a control channel, simultaneously. If the same antenna is to be used for transmission of both signals this requires that the antenna has to be able to operate at significantly higher power levels than at transmission at other operation modes than mode S. This means that in order to be able to operate in mode S the antenna system cannot be operated at maximum power level at transmission at other operation modes than mode S. Thus, the main antenna has to operate backed off during a predominant part of the time.

Also, it is advantageous if the signal processing device, i.e. the interrogator, can be bought from any supplier and that the additional work required for configuring the signal processing device for the current antenna system implementation is kept to an absolute minimum.

Please note that there are also other standards than the herein exemplified, STANAG 4193 and ICAO, which identification functionality can be operated according to. An example of yet such a standard is AIMS.

Figure 2:
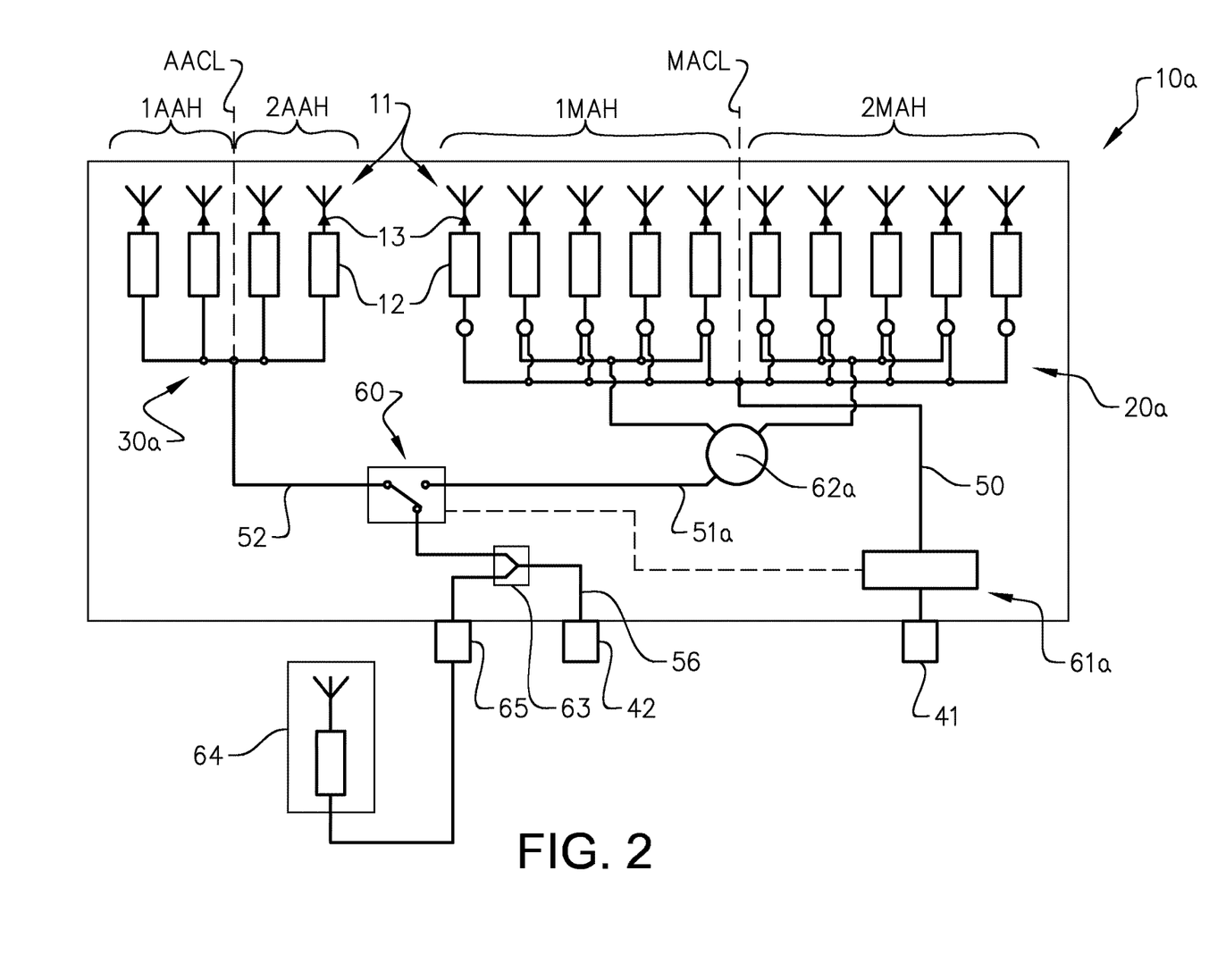

FIG. 2 discloses a schematic disclosure of a first exemplary embodiment of an antenna system 10a according to the present invention. The antenna system 10a comprises a main antenna 20a and an auxiliary antenna 30a. The main antenna 20a and the auxiliary antenna 30a comprises a number of antenna element 11, wherein according to the exemplary embodiment of FIG. 2 the main antenna 20a comprises ten antenna elements 11 and the auxiliary antenna 30a comprises four antenna elements 11. The number of antenna elements is determined e.g. by the application in which the antenna system is implemented and desired antenna characteristics. As is the case for the exemplary embodiment disclosed in FIG. 2, for some applications in may be preferred to use different number of antenna elements 11 of the main antenna 20a for transmitting an electromagnetic wave provided from the first channel interface 41, which may be a sum channel signal, then when transmitting an electromagnetic wave provided from the second channel interface 42. This is e.g. dependent on the desired characteristics of the transmitted signal and the desired characteristics of the transmitted signal may e.g. be determined by prevailing standards. Different number of antenna elements 11 can also be used depending on in which transmission mode transmission currently is performed.

The antenna elements 11 of the main antenna 20a are arranged about a centerline of the main antenna MACL, wherein a first main antenna half 1MAH and a second main antenna half 2MAH is formed. The number of antenna elements 11 of respective first and second antenna half 1MAH, 2MAH is equal and they are symmetrically arranged in regards to the centerline of the main antenna MACL. Correspondingly, the antenna elements 11 of the auxiliary antenna 30a are arranged about a centerline of the auxiliary antenna AACL, wherein a first auxiliary antenna half 1AAH and a second auxiliary antenna half 2AAH is formed. The number of antenna elements 11 of respective first and second antenna half 1AAH, 2AAH are equal and they are symmetrically arranged in regards to the centerline of the auxiliary antenna AACL. Each antenna element is provided with a phase shifter 12. The phase shifters 12 of antenna elements 11 are configured to control the transmission phase of an electromagnetic wave transmitted by respective antenna element.

The exemplary embodiment of an antenna system 10a of FIG. 2 is an active electronically steerable antenna system, wherein respective antenna element 11 is provided with an amplifier 13.

The antenna system 10a comprises the first channel interface 41 and the second channel interface 42. The first channel interface 41 is connected to the main antenna 20a by means of a first main antenna distribution network 50. The second channel interface 42 is configured to be connectable to the main antenna 20a by a second main antenna distribution network 51a and to the auxiliary antenna 30a by an auxiliary antenna distribution network 52. If the second channel interface 42 is set to be connected to the main antenna 20a or the auxiliary antenna 30a is determined by a switch 60, configured to be set in a first operation mode and a second operation mode. The second channel interface 42 is connected to the first switch 60 by means of a pre distribution network 56.

The switch 60 is connected to a transmission input means 61a. The transmission input means 61a of the exemplary embodiment of an antenna system 10a disclosed in FIG. 2 comprises a detector 61a. The detector 61a is arranged to the first channel interface 41, wherein the detector 61a is configured to detect if transmission is performed via the first channel interface 41. If no transmission is detected by the detector 61a the switch 60 is set in the second operation mode whereby the switch 60 provides such that the second channel interface 42 is connected to the main antenna 20a by the second main antenna distribution network 51a. If the detector detects transmission via the first channel interface 41 the switch 60 is set in the first operation mode whereby the first switch 60 provides such that the second channel interface 42 is connected to the auxiliary antenna 30a by the auxiliary antenna distribution network 52. Since only one electromagnetic wave or RF signal at the time is transmitted by the main antenna 20a the main antenna 20a can be configured to operate at maximum power and efficiency level irrespective of which operation mode the antenna system 10a currently is operated in.

Thereby the main antenna 20a can be operated to transmit at maximum power level, given the specific circumstances and including other deliberate trade offs and limitations necessary, and at maximum efficiency, given the specific circumstances and including other deliberate trade offs and limitations necessary, when transmitting at all operation modes, including operation mode S. When only transmission via the first channel interface 41 is performed the main antenna 20a can be operated at maximum power level and at maximum efficiency, when only transmission via the second channel interface 42 is performed the main antenna 20a can also be operated at maximum power level and at maximum efficiency and when transmission via both the first and second channel interfaces 41, 42 is performed simultaneously, such as when operating in mode S, transmission of a signal by the main antenna 20a can be performed at maximum power level and at maximum efficiency and a signal provided from the second channel interface 42 is transmitted by the auxiliary antenna 30a. The auxiliary antenna 30a may also be operated at the maximum power level and maximum efficiency of the auxiliary antenna 30a.

The antenna system 10a further comprises a power splitting device 62a, arranged in the second main antenna distribution network 51a. The power splitter device 62a may be circulator, a 180 degree hybrid or similar configured to, at transmission, split one electromagnetic wave provided by the signal processing means, via the second channel interface 42, into two outgoing, one fed to the first main antenna half 1MAH and one fed to the second main antenna half 2MAH. The power splitting device 62a may also be used to obtain a 180 degrees transmission phase offset between the antenna elements 11 of the first main antenna half 1MAH and the antenna elements 11 of the second main antenna half 2MAH that are characteristic for transmission of a delta channel signal.

The exemplary embodiment of an antenna system 10a disclosed in FIG. 2 is arranged to a back filler element 64, wherein the back filler element 64 also is fed via the second channel interface 42 by means of a back filler element power splitter 63, provided in the pre distribution network 56, and a back filler element interface 65. The back filler element 64 is provided to transmit a signal covering potential back lobes, and to some extent also side lobes.

Figure 3:
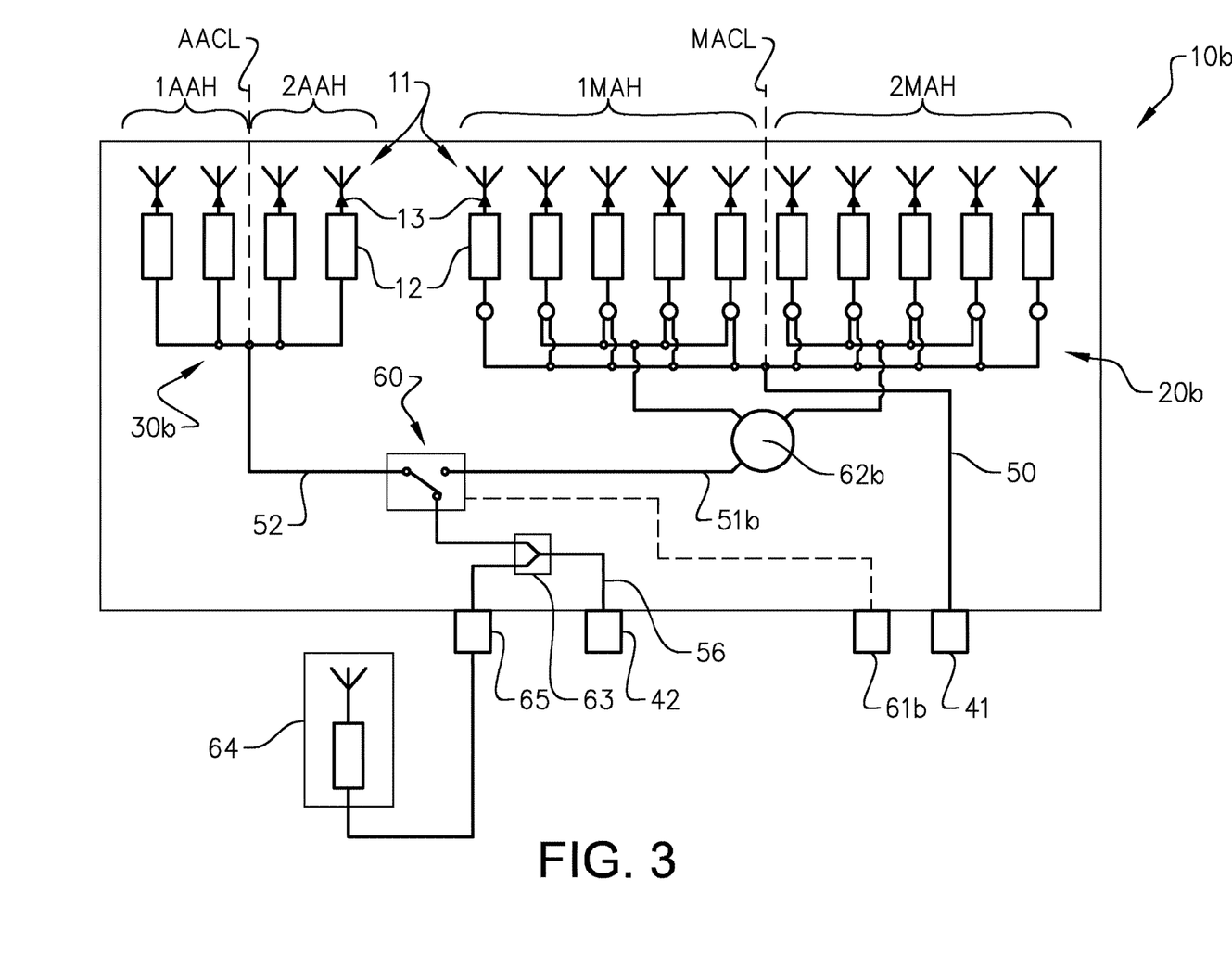

FIG. 3 discloses a schematic disclosure of a second exemplary embodiment of an antenna system 10b according to the present invention. The second exemplary embodiment of an antenna system 10b of FIG. 3 corresponds to the first exemplary embodiment of antenna system 10a of FIG. 2 except from one aspect, the realization of the transmission input means 61b.

The transmission input means 61b of the exemplary embodiment disclosed in FIG. 3 comprises an information interface 61b. The information interface 61b is configured to receive input information from a signal processing device (not shown) concerning future transmissions, and if transmission via the first transmission channel 41 is expected the transmission input means 61b is configured to set, or at least contribute to that the first switch 60 is set, in the first operation mode wherein the second channel interface is set to be connected to the auxiliary antenna 30b.

The input information provided by the signal processing device to the information interface 61*b* may e.g. be a suppression pulse output signal. Such signal discloses when an interrogation signal is about to be transmitted. The suppression output signal is configured to disclose specific signal characteristics such that the first switch 60 can be controlled depending on if transmission is expected. The suppression output signal is high during a predetermined period of time before transmission of an interrogation signal, and is subsequently lowered within a predetermined period of time after transmission of the interrogation signal, all according to prevailing standards.

Thus, exemplary embodiments of antenna systems 10*b* where the transmission input means 61*b* comprises an information interface 61*b* rely on information provided from a signal processing device.

Figure 4:
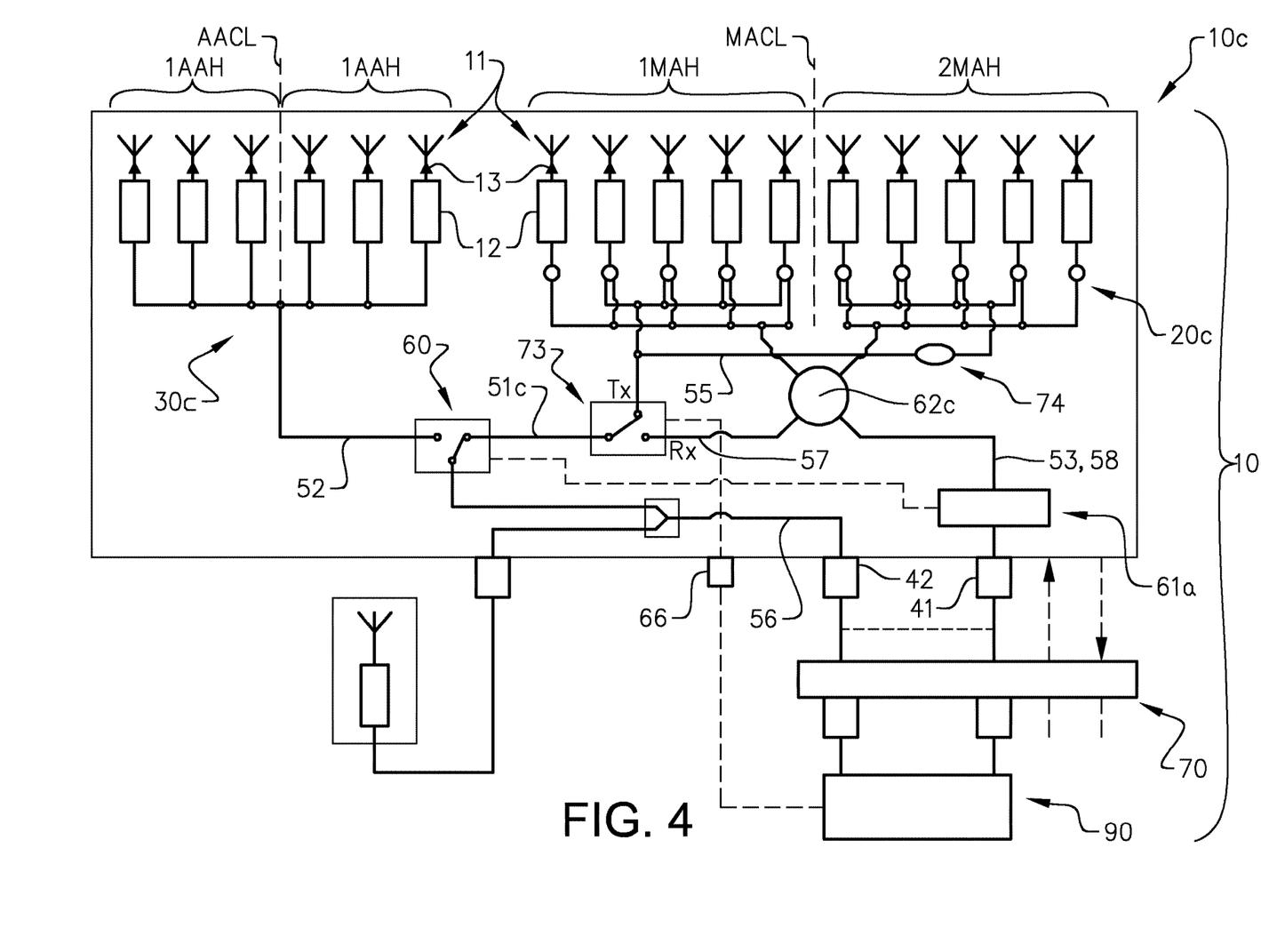

Referring now to FIG. 4, disclosing a schematic disclosure of a third exemplary embodiment of an antenna system 10*c* according to the present invention. The third exemplary embodiment of an antenna system 10*c* is, with a few exceptions, configured in accordance to what previously has been disclosed for the first and second embodiments of an antenna system 10*a*, 10*b* in relation to FIGS. 2 and 3. Thus, the third exemplary embodiment provides the same advantages as disclosed for the first two exemplary embodiments. Additionally, the third embodiment of an antenna system 10*c* is provided with a few more features than the first and second embodiments of an antenna system 10*a*, 10*b*.

First of all, in the exemplary embodiment of FIG. 4 the auxiliary antenna 30*c* comprises six antenna elements 11. As previously disclosed, the number of antenna elements 11 of the main antenna 20*c* and the auxiliary antenna 30*c* may e.g. be dependent on desired antenna characteristics. The second channel interface 42 is connected to the first switch 60 by means of a pre distribution network 56, wherein the initial distribution network is common for both the second main antenna distribution network 51*c* and the auxiliary antenna distribution network 52.

For all embodiments disclosed herein, the antenna system may also comprise an uneven number of antenna columns, but when transmitting an ISLS control signal only an even number of, in relation the centerline of the antenna symmetrically arranged, antenna columns are active, thus used for transmission.

The third exemplary embodiment of an antenna system 10*c* disclosed in FIG. 4 also comprises a second switch 73 arranged in the second main antenna distribution network 51*c*, and a suppression pulse output signal interface 66. The second switch 73 is provided in order to switch between a transmission mode and a reception mode, indicated by Tx and Rx. The antenna system 10*c* further comprises a power splitting device 62*c*. The power splitting device 62*c* can be defined as being a part of the first main antenna distribution network 53. At reception the first main antenna distribution network 53 can be defined as comprising a part of the main antenna distribution network 53 entitled sum channel reception distribution network 58 and a part of the first main antenna distribution network 53 entitled delta channel reception distribution network 57.

The second switch 73 is configured to receive a suppression pulse output signal. According to the exemplary embodiment of FIG. 4 such suppression pulse output signal is provided from the signal processing device 90, via the suppression pulse output signal interface 66. Prevailing standards such as STANAG 4193 or ICAO Annex 10, volume IV, states that signal processing devices 90, thus interrogators, should be able to provide a suppression pulse output signal disclosing when an interrogation signal is about to be transmitted. As previously disclosed, the suppression output signal is configured to disclose specific signal characteristics such that e.g. the first and/or the second switch 60, 73 is informed of when transmission is expected. The suppression output signal is high during a predetermined period of time before transmission of an interrogation signal, and is subsequently lowered within a predetermined period of time after transmission of the interrogation signal, all according to prevailing standards.

The suppression pulse output signal interface 66 may, but is not limited to, be transmission input means 61*b* in form of an information interface 61*b* as referred to in relation to FIG. 3.

At operation in transmission mode Tx the second switch 73 is set to connect the second main antenna distribution network 51*c* to an end portion of the second main antenna distribution network 55 (as is shown in FIG. 4). According to the exemplary embodiment disclosed in FIG. 4 the end portion of the second main antenna distribution network 55 comprises a second power splitting device 74, which preferably is controllable and which may be configured to, if desired, provide a 180 degrees transmission phase offset between the antenna elements 11 of the first main antenna half 1MAH and the antenna elements 11 of the second main antenna half 2MAH that are characteristic for transmission of a delta channel signal.

Additionally, for the operation described the first switch 60 is set in the second operation mode wherein the second channel interface 42 is connected to the second main antenna distribution network 51*c*.

At operation in reception mode Rx the second switch 73 is set to connect the second main antenna distribution network 51*c* with the delta channel reception distribution network 57 and to the power splitting device 62*c* of the first main antenna distribution network 53, of the main antenna 20*c*. Thereby, at operation in reception mode Rx, the main antenna 20*c* is both connected to the first channel interface 41 by the first main antenna distribution network 53, in this case acting as a sum channel reception network 58, and to the second channel interface 42 by the delta channel reception distribution network 57, the second switch 73, the second main antenna distribution network 51*c*, the first switch 60 and the pre distribution network 56.

Additionally, for the operation described the first switch 60 is set in the second operation mode wherein the second channel interface 42 is connected to the second main antenna distribution network 51*c*.

At operation in reception mode Rx, when a RF signal is received by the main antenna 20*c* the signal is fed to the power splitting device 62*c*, wherein the power splitter device 62*c* splits up the received signal into what preferably may be a sum channel signal part and a delta channel signal part. The sum channel signal part is provided via the sum channel reception network 58 (first main antenna distribution network 53) to the first channel interface 41 and the delta channel signal part is provided via the delta channel reception distribution network 57, the second main antenna distribution network 51*c* and the pre distribution network 56 to the second channel interface 42. From respective first and second signal processing means 41, 42 the received sum and delta parts of the signal is provided to a signal processing device 90 wherein the received sum and delta parts of the signal is processed. Processing of received sum and delta channel signals are considered to be common general knowledge and is not further disclosed herein.

Antenna systems comprising a second switch and comprising a transmission input means in turn comprising an information interface, instead of or together with transmission input means comprising a detector, can naturally also be realized.

The third exemplary embodiment of an antenna system 10c disclosed in FIG. 4 is further arranged to an interface controller 70. The antenna system 10c and the interface controller 70 are comprised in an antenna arrangement 100 together with the signal processing device 90. The interface controller 70 is provided between the first and second channel interfaces 41, 42 of the antenna system 10b and the signal processing device 90. The signal processing device 90, generally referred to as interrogator, generates electromagnetic waves which, depending on which type of signal they represent, are provided to the antenna system 10c via the first or second channel interfaces 41, 42. Transmission of electromagnetic waves in the sum channel are generally provided to the antenna system 10c via the first channel interface 41 and transmission of electromagnetic waves in the delta or difference channel, such as when transmitting a control signal, are generally provided to the antenna system 10c via the second channel interface 42. The interface controller 70 is configured to control and adapt the power levels of electromagnetic waves provided by the signal processing device 90 to the antenna system 10c and/or to control the power levels of electromagnetic waves received by antenna system 10c, fed to and subsequently processed at the signal processing device 90 or any other device connected thereto.

Thereby the compatibility between antenna systems 10c and various signal processing devices 90 is improved. This helps to further enable that signal processing devices 90, i.e. interrogators, may be bought from any supplier, without the need of costly additional customer specific adaptions or additional development work, and that less complex interrogators from conventional mechanically rotated antennas may be used.

The invention claimed is:

1. An antenna system (10) for providing identification functionality and configured to be connected to a signal processing device (90), the antenna system (10) comprising:
   a main antenna (20) configured to at least transmit electromagnetic waves,
   an auxiliary antenna (30) configured to at least transmit electromagnetic waves,
   a first channel interface (41) configured to at least receive an electromagnetic waveform provided from the signal processing device (90) when the antenna system (10) is transmitting via a first transmission channel,
   a second channel interface (42) configured to at least receive an electromagnetic waveform provided from the signal processing device (90) when the antenna system (10) is transmitting via a second transmission channel,
   a first switch (60), and
   a transmission input means (61),
   wherein:
   the first switch (60) is configured to be switchable between a first operation mode and a second operation mode,
   when set in the first operation mode, the second channel interface (42) is set to be in connection with the auxiliary antenna (30),
   when set in the second operation mode, the second channel interface (42) is set to be in connection with the main antenna (20),
   the transmission input means (61) comprises either a detector (61a) or a transmission input means (61b), the detector being configured to provide information to the first switch (60) when transmission in the first transmission channel is detected, the transmission input means being configured to provide information to the first switch (60) when input information from a signal processing device (90) is received, and
   either:
   if the transmission input means (61a) is the detector, the first switch (60) is set in the first operation mode when the transmission is detected and the first switch (60) is set in the second operation mode absent detection of the transmission; or
   if the transmission input means (61) is the transmission input means (61b), the first switch (60) is set in the first operation mode when the input information is received and the first switch (60) is set in the second operation mode absent receipt of the input information.

2. An antenna system (10) according to claim 1, wherein:
   the first channel interface (41) is arranged to be in connection to the main antenna (20) by means of a first main antenna distribution network (50), and
   the second channel interface (42) is arranged to be connectable to the main antenna (20) by means of a second main antenna distribution network (51).

3. An antenna system (10) according to claim 1, wherein the second channel interface (42) further is arranged to be connectable to the auxiliary antenna (30) by means of an auxiliary antenna distribution network (52).

4. An antenna system (10) according to claim 2, wherein:
   the phase of an electromagnetic waveform fed via the first main antenna distribution network (50, 53) is dependent on the configuration of the first main antenna distribution network (50, 53), the phase of an electromagnetic waveform fed via the second main antenna distribution network (51) is dependent on the configuration of the second main antenna distribution network (51), and
   the phase of an electromagnetic waveform fed via the auxiliary antenna distribution network is dependent on the configuration of the auxiliary antenna distribution network (52),
   whereby the phase of an electromagnetic waveform fed via at least one of the first main antenna distribution network (50, 53), the second main antenna distribution network (51), and the auxiliary antenna distribution network (52) are controllable by means of the configuration of respective distribution network (50, 51, 52, 53).

5. An antenna system (10) according to claim 1, wherein the antenna system is an active electronically steerable antenna system.

6. An antenna system (10c) according to claim 5, wherein:
   the main antenna (20c) is configured for receiving electromagnetic waves,
   the antenna system (10c) further comprises a second switch (73), wherein the second switch (73) is configured to switch between a transmission mode (Tx) and a reception mode (Rx),
   when set in the transmission mode (Tx), the second channel interface (42) is set to be in connection with an end portion of the second main antenna distribution network (55) of the second main antenna distribution network (51c) of the main antenna (20c), and when set in the reception mode (Rx), the second channel interface (42) is set to be in connection with the first main antenna distribution network (53) of the main antenna (20).

7. An antenna system (10c) according to claim 6, wherein:
the second switch (73) is arranged to be in connection with a signal processing device (90),
the second switch (73) further is configured to receive a suppression pulse output signal from the signal processing device (90) if transmission is expected, and
if transmission is expected the second switch (73) is configured to be set in transmission operation mode.

8. A method of operating an antenna system (10), wherein the method comprises the steps of:
providing the antenna system (10) comprising:
a main antenna (20), configured to at least transmit electromagnetic waves,
an auxiliary antenna (30) configured to at least transmit electromagnetic waves,
a first channel interface (41) configured to at least receive an electromagnetic waveform provided from the signal processing device (90) when the antenna system (10) is transmitting via a first transmission channel,
a second channel interface (42), configured to at least receive an electromagnetic waveform provided from the signal processing device (90) when the antenna system (10) is transmitting via a second transmission channel,
a first switch (60), configured to be set in a first operation mode and a second operation mode, wherein: (a) when set in the first operation mode the first switch (60) is configured to set the second channel interface (42) in connection to the auxiliary antenna (30), and (b) when set in the second operation mode the first switch (60) is configured to set the second channel interface (42) in connection to the main antenna (20), and
a transmission input means (61) comprising either a detector (61a) or a transmission input means (61b), the detector being configured to provide information to the first switch (60) when transmission in the first transmission channel is detected, the transmission input means being configured to provide information to the first switch (60) when input information from a signal processing device (90) is received,
applying the transmission input means (61), and
if transmission via the first transmission channel is expected, setting the first switch (60) in the first operation mode,
either:
if the transmission input means (61a) is the detector, setting the first switch (60) in the first operation mode when the transmission is detected and setting the first switch (60) in the second operation mode absent detection of the transmission; or
if the transmission input means (61) is the transmission input means (61b), setting the first switch (60) in the first operation mode when the input information is received and setting the first switch (60) in the second operation mode absent receipt of the input information.

9. An antenna arrangement (100) comprising:
an antenna system (10) according to claim 1, and
a signal processing device (90).

10. An antenna arrangement (100) according to claim 9, wherein:
the antenna system (10) further comprises an interface controller (70), and
the interface controller (70) is configured to control the power level of electromagnetic waveforms fed from/to the signal processing device (90) at least one of to or from at least one of the first or the second channel interface (41, 42).

11. An antenna arrangement according to claim 10, wherein the antenna system
further comprises a back filler element (64).

* * * * *